United States Patent Office 3,489,756
Patented Jan. 13, 1970

3,489,756
2-CARBOCYCLIC-6-TERTIARY AMINO ALKOXY NAPHTHALENES AND TETRALINS
William A. Bolhofer, Frederick, James M. Sprague, Gwynned Valley, and John J. Baldwin, Lansdale, Pa., assignors to Merck & Co., Inc., Rahway, N.J., a corporation of New Jersey
No Drawing. Continuation of application Ser. No. 431,216, Feb. 8, 1965. This application July 10, 1967, Ser. No. 652,373
Int. Cl. C07c 93/14, 93/08
U.S. Cl. 260—247.7                22 Claims

ABSTRACT OF THE DISCLOSURE (6-aminoalkoxy-2-naphthyl)cycloaliphatic products and the tetralin analogs thereof wherein the cycloaliphatic moiety is a five or six-membered carbocyclic ring which may be substituted by one or more hydroxy, alkanoyloxy, alkynyl, alkenyl, perfluoroalkenyl, hydroxyalkyl, alkanoyloxyalkyl, alkanoyl, methylenyl, cyanomethylenyl, etc. substituents. The products are anti-androgenic agents which may be administered either in the form of their free bases or in the form of their acid addition salts.

The instant products are prepared by treating an appropriate (6-aminoalkoxy-2-naphthyl)cycloalkanone or a cycloalkenone analog thereof with a suitable Grignard reagent or with an alkylhaloalkanoate or with any other reagent suitable for introducing an appropriate substituent on the carbonyl carbon of the cycloalkanone or cycloalkenone nucleus.

---

This application is a continuation of Ser. No. 431,216, filed Feb. 8, 1965, now abandoned.

This invention relates to new compounds having anti-androgenic properties as well as utility in the study and treatment of hypercholesteremia and atherosclerosis. More specifically, this invention relates to new compounds of the formula

in which A may be naphthalene or tetralin having the $R_1O$ and $R_2$ substituents in the 2 and 6 positions, the said naphthalene or tetralin rings being possibly substituted with alkyl ($R_3$) and halogens ($X_1$), the $R_1$ being a di(lower alkyl)amino lower alkyl group or an (-morpholin-) lower alkyl group and the $R_2$ being five or six membered carbocyclic rings which may carry a hydroxyl or acyloxy plus an unsaturated hydrocarbon or substituted unsaturated hydrocarbon group (or a methylenyl or substituted methylenyl group in place of both) in the 3 position and which may also carry alkyl or halogen substituents, and which may have a cyano in the 3 position whenever a hydroxyl is also on that carbon.

Theories have been advanced in which the acne problems of adolescents are postulated as being related to androgenic activity. If this be true, there is a need for compounds which will combat such activity without the undesirable side effects of the female sex hormones. The compounds of this invention have such properties. Further possible clinical uses of such anti-androgen properties have also been suggested, such as, e.g., treatment of prostate cancer.

In U.S. Letters Patent 2,687,436, Frederick C. Novello described a class of compounds which can be summarized as 6-alkoxy or hydroxy-2-naphthyl cyclohexane derivatives. These compounds were described as being useful as intermediates in the synthesis of steroids and some of them were stated to have estrogenic activity. They are, however, completely inactive as anti-androgens. In U.S. Letters Patent 3,139,430 we described a related class of 6-dialkylaminoalkoxy naphthalenes which were useful as anti-cholesteremics but many of which had little or no anti-androgen properties.

We have found that compounds of the structure described above in the first paragraph are potent agents for combatting excessive androgenic activity. These compounds are related to the compounds described by us in U.S. Letters Patent 3,139,430 in that the cyclohexanone or cyclopentanone nucleus now contains, in place of the ketone oxygen, a hydroxy and an unsaturated hydrocarbon or substituted hydrocarbon or a methylene or substituted methylene. Whereas many of the antihypercholesteremic compounds of said Patent 3,139,430 have little or no anti-androgen properties, the compounds of this invention are quite active as anti-androgens and are for the most part far less active in reducing substituted methylenyl, alkenyl or alkynyl group linked to the $R_2$ ring moiety.

It is an advantage of the compounds of our invention that they are easily administered orally. They can be utilized as pharmaceutically active salts such as the hydrochloride, hydrobromide, sulfate and the like. Since they can be administered orally, they can form part of the diet of an animal or human. When applied parenterally they can be applied as oils or as solutions of the free base or of the salts.

The compounds of this invention are prepared from the various compounds in our cited U.S. Patent 3,139,430 which contain a keto group in the $R_2$ part of the molecule. The preparation of such starting material, with and without other substituents and/or unsaturation in either the naphthalene or $R_2$ moieties is well described therein. These ketones are condensed with the appropriate reagents to introduce the necessary substituents on the carbon which had been the carbonyl and the products, where necessary are further reacted in order to convert these substituents into others.

When these ketones are reacted with an alkynyl or alkenyl Grignard reagent, the corresponding 1-hydroxy-1-alkynyl (or alkenyl) derivative is formed. For example, reaction of a 3-(6-dialkylamino-alkoxy-2-naphthyl)-1-cyclohexanone with vinyl magnesium bromide gives the corresponding 3-(6-dialkylaminoalkoxy-2-naphthyl) - 1-vinylcyclohexan-1-ol.

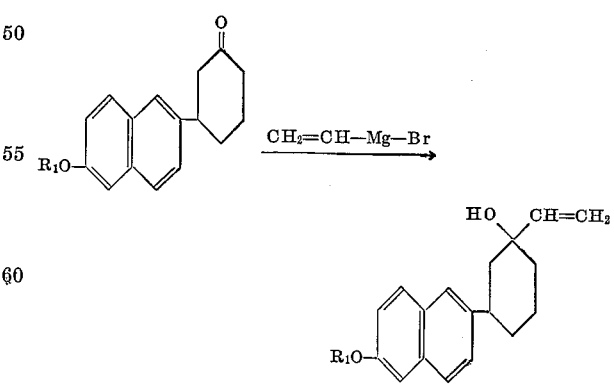

The corresponding cyclopentanones, cyclohexenones, cyclopentenones, as well as the tetralin derivatives and the various alkyl and halogen substituted analogs give analogous products. The reaction of alkynyl or perfluoroalkenyl Grignard reagents with any of these ketones also gives the correspondingly substituted products with the vinyl group replaced by the alkynyl, etc. group used.

When any of these ketones is condensed with a lower alkyl chloracetate in the presence of sodamide in an inert solvent, the corresponding spiroglycidic acid is obtained.

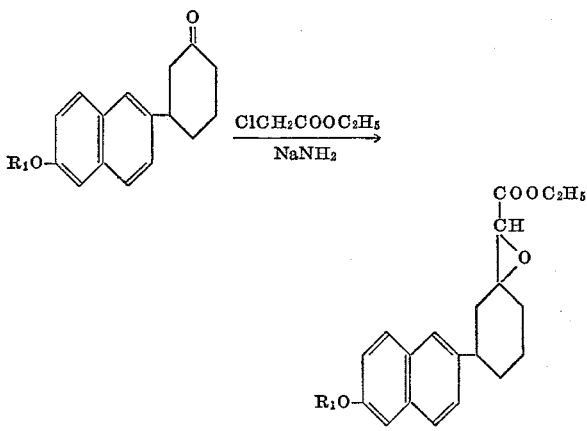

Reduction of these compounds with a carbonyl reducing reagent such as lithium aluminum hydride opens the epoxide ring and redudces the acid to an alcohol function.

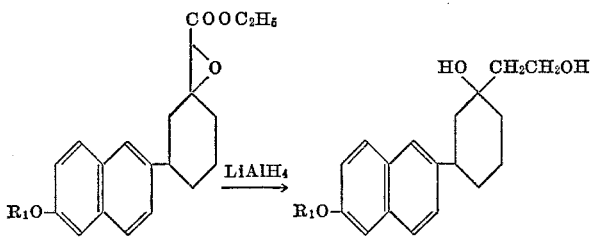

Here, too, any of the other keto products of Patent 3,139,430 can be similarly converted. Other esters of chloracetic acid can be used.

These various hydroxy compounds are readily acylated by lower alkanoic anhydrides to give the corresponding esters. In the case of the 1-alkynyl-1-ols, the anhydride converts the alkynyl group to a lower alkanoyl group, if mercuric acetate is also present during the acylation.

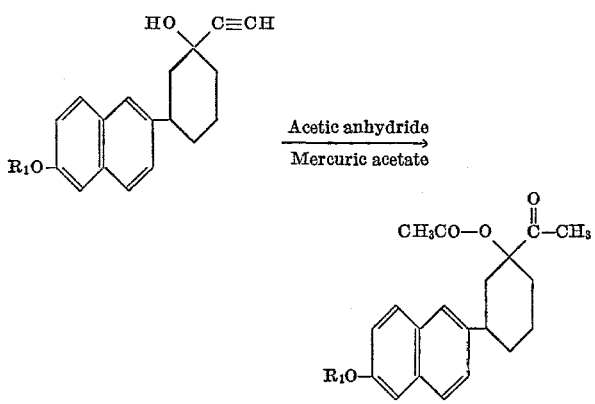

Without the mercuric acetate, the only reaction is acylation of the hydroxyl group. The use of mercuric acetate is the method by which a 1-lower alkanoyl-1-hydroxy compound can be made, since the acetoxy group is readily saponified. Alternatively, the 1-lower alkanoyl-1-hydroxy compound can be obtained directly by using mercuric oxide in sulfuric acid. Reduction of the lower alkanoyl ketone group with a carbonyl reducing agent such as LiAlH₄ affords access to the α-hydroxy lower alkyl analogs.

When the various ketone derivatives of U.S. Patent 3,139,430 are reacted with the proper Wittig reagent, the keto oxygen is readily replaced with a methylenyl or a substituted methylenyl group such as cyanomethylenyl, alkylmethylenyl, arylmethylenyl, alkoxymethylenyl, or alkoxycarbonylmethylenyl groups.

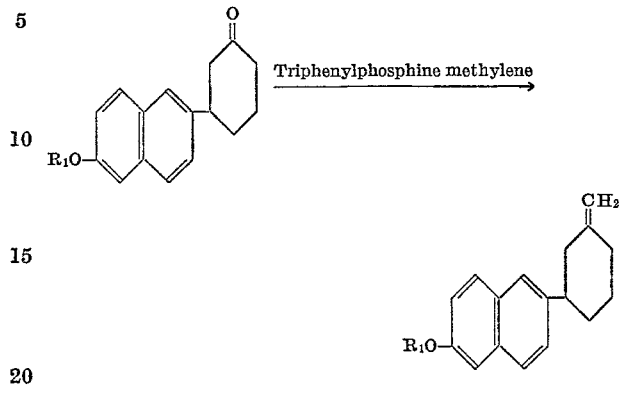

These products also form part of this invention. Again, any of the various keto compounds of said patent can be used in this reaction, whether $R_2$ is a five-membered or six-membered ring, unsaturated or not, and unsubstituted or not.

$R_1$ in the general formula of the compounds of our invention is defined as a di(lower alkyl)amino lower alkyl. It is necessary for anti-androgen activity that the di(lower alkyl)amino group be in the alkyl group, since the simple alkoxy compounds described by us have no such activity. $R_1$ can be such groups as dimethylaminoethyl, propyl, isopropyl, butyl, diethylaminoethyl, propyl, isopropyl, isobutyl, or butyl, dipropylaminoethyl, propyl, isobutyl or butyl, methylethylaminoethyl, propyl, or butyl, and the like. Preferably, it is diethylaminoethyl. The lower alkyl groups on the amino nitrogen may also be joined to form a ring such as morpholine and thus $R_1$ may be also, in a separate aspect of our invention, N-morpholinoethyl, propyl, isopropyl, butyl, isobutyl and the like.

Dosages of the order of 250 mg. per day are approximately correct for humans with a range of 50–500 mg. The compounds of our invention are not all equivalent and the dosages must be varied to fit the activity of the compounds since some are more potent than others. The products can conveniently be administered in tablets or capsule form.

EXAMPLE 1

3-(6-diethylaminoethoxy-2-naphthyl)-1-ethynyl-2-cyclopenten-1-ol

Ethylmagnesium bromide was prepared from 3.07 g. (0.138 mole) of magnesium turnings and 13.6 g. (0.125 mole) of ethyl bromide in 100 ml. of tetrahydrofuran. This solution is added to 150 ml. of tetrahydrofuran saturated with acetylene over 1¾ hours with stirring and with a continuous stream of acetylene bubbling into the mixture. Then 8.43 g. (0.025 mole) of 3-(6-diethylaminoethoxy-2-naphthyl)-2-cyclopenten-1-one in 50 ml. of tetrahydrofuran is added over ½ hour. The mixture is stirred for 44 hours at room temperature under nitrogen. Then the mixture is decomposed with aqueous NH₄Cl and the tetrahydrofuran is removed under reduced pressure. Ether-benzene extraction gives 10.2 g. of oily solid. Purification with cyclohexane gives 2.65 g., M.P. 104.5–106.5° C.

When any of the other cyclopentanone or cyclopentenone derivatives of U.S. Patent 3,139,430 are used in place of the above starting material, the correspondingly substituted 1-ethynylcyclopentanol or cyclopentenol is obtained. When 1-propyne or 1-butyne is used in place of acetylene in any of the above preparations, the corresponding 1-loweralkynylcyclopentanol or cyclopentenol is obtained.

EXAMPLE 2

3-(6-diethylaminoethoxy-2-naphthyl)-1-ethynyl-2-cyclohexen-1-ol

Ethyl magnesium bromide is prepared from 7.60 g. (0.31 mole) of magnesium turnings and 29.92 g. (0.275 mole) of ethyl bromide in 200 ml. of tetrahydrofuran. This solution is added to 150 ml. of tetrahydrofuran saturated with acetylene over 1¾ hours with stirring while continuously bubbling in acetylene under nitrogen. Then 13.2 g. (0.039 mole) of 3-(6-diethylaminoethoxy-2-naphthyl)-2-cyclohexan-1-one in 300 ml. of tetrahydrofuran is added during a 15 minute period. The mixture is stirred at room temperature for 65 hours. The cooled mixture is decomposed with $NH_4Cl$ solution. The tetrahydrofuran is removed under reduced pressure and replaced by ether. The ether layer is washed, dried, and concentrated to give a 69.5% yield of yellow solid. Recrystallizations from methylcyclohexane give a melting point of 113–116.5° C.

When any of the other cyclohexenones shown in U.S. Patent 3,139,430 are used in place of the starting material, the correspondingly substituted 1-ethynylcyclohexenol is obtained. When 1-propyne or 1-butyne is used in place of acetylene in the above preparations, the corresponding 1-loweralkynylcyclohexenol is obtained.

EXAMPLE 3

3-(6-diethylaminoethoxy-2-naphthyl)-1-ethynylcyclohexan-1-ol (and hydrochloride)

Ethyl magnesium bromide is prepared from 7.60 g. (0.31 mole) of magnesium turnings and 29.92 g. (0.275 mole) of ethyl bromide in 200 ml. of tetrahydrofuran. This solution is added to 150 ml. of tetrahydrofuran saturated with acetylene over 1¾ hours with stirring and with a continuous stream of acetylene bubbling into the mixture. Then 16.97 g. (0.05 mole) of 3-(6-diethylaminoethoxy-2-naphthyl)cyclohexanone in 200 ml. of tetrahydrofuran is added over ½ hour. The mixture is stirred at room temperature for 65 hours under nitrogen. The cooled mixture is decomposed with aqueous $NH_4Cl$ and the tetrahydrofuran is removed under reduced pressure. Ether extraction gives 17.8 g. of yellow oil which gives a solid hydrochloride in 92.5% yield. Recrystallized M.P. 212–215° C.

When any of the other cyclohexanones shown in U.S. Patent 3,139,430 are used in place of the above starting material, the correspondingly substituted 1-ethynyl cyclohexanol is obtained. When 1-propyne or 1-butyne is used in place of acetylene, the corresponding 1-loweralkynylcyclohexanol is obtained.

EXAMPLE 4

3-(6-diethylaminoethoxy-2-naphthyl)-1-vinyl-2-cyclohexen-1-ol

Vinyl magnesium bromide is prepared from 7.28 g. (0.31 mole) of magnesium turnings and 32.1 g. (0.3 mole) of vinyl bromide in 70 ml. of tetrahydrofuran. Then 21.4 g. (0.0635 mole) of 3-(6-diethylaminoethoxy-2-naphthyl)-2-cyclohexen-1-one in 100 ml. of tetrahydrofuran is added over 1 hour with stirring. The reaction is stirred under nitrogen for 16 hours at room temperature. The cooled mixture is decomposed with aqueous $NH_4Cl$ and the tetrahydrofuran is removed under reduced pressure. Extraction with ether gives 17.7 g. of yellow oil.

When 1-bromo-1-propene or 1-bromo-1-butene is used in place of vinyl bromide, the corresponding 1-lower alkenylcyclohexenol is obtained. When any of the other cyclohexenones of U.S. Patent 3,139,430 are used, the corresponding 1-loweralkenylcyclohexenol is obtained.

EXAMPLE 5

3-(6-diethylaminoethoxy-2-naphthyl)-1-vinyl-cyclohexan-1-ol and its citrate salt Vinyl magnesium bromide is prepared from 6.70 g. (0.275 mole) of magnesium turnings and 26.7 g. (0.25 mole) of vinyl bromide in 60 ml. of tetrahydrofuran. Then 16.97 g. (0.05 mole) of 3-(6-diethylaminoethoxy-2-naphthyl)cyclohexanone in 100 ml. of tetrahydrofuran is added over 1 hour with stirring. The mixture is stirred for 16 hours at room temperature under nitrogen. The cooled mixture is decomposed with $NH_4Cl$ solution and the tetrahydrofuran is removed under reduced pressure. Extraction with ether gives 17.9 g. of the free base as a yellow oil. This gives 23.2 g. of white solid citrate when treated with citric acid—81.5% yield. Repeated recrystallization from isopropanol gives a melting point of 126–128° C.

When any of the other cyclohexanones of U.S. Patent 3,139,430 are used in place of the above starting material, the corresponding 1-loweralkenylcyclohexanol is obtained.

EXAMPLE 6

3-(6-diethylaminoethoxy-2-naphthyl)-1-trifluorovinyl-1-cyclohexanol and its citrate salt Trifluorovinyl magnesium bromide is prepared at −10° C. by bubbling 16.1 g. (0.1 mole) of bromotrifluoroethylene into a stirred mixture of 2.68 g. (0.105 mole) of magnesium turnings in 100 ml. of tetrahydrofuran. The mixture is stirred at −10° C. for 2½ hours. Then a solution of 8.48 g. (0.025 mole) of 3-(6-diethylaminoethoxy-2-naphthyl)cyclohexan-1-one in 100 ml. of tetrahydrofuran is added over one hour. The mixture is stirred at −10° C. for 16 hours. Then the mixture is allowed to warm to room temperature over 4½ hours and then is decomposed with aqueous $NH_4Cl$. The tetrahydrofuran is removed under reduced pressure. Extraction with ether gives 8.8 g. of the free base as a brown oil. Treatment of this with citric acid gives 11.1 g. (73%) of white solid citrate salt. Recrystallization from isopropanol gives a melting point of 129–131° C.

When any of the other cyclohexanones of U.S. Patent 3,139,430 are used in place of the above starting material, the corresponding 1-trifluoroethenylcyclohexanols and their citrates are obtained.

EXAMPLE 7

Ethyl 5-[6-(2-diethylaminoethoxy)-2-naphthyl]-1-oxaspiro-[2,5]-octane-2-carboxylate and its citrate salt Sodamide (3.8 g., 0.086 mole) is added over 1.5 hours to a solution of 3-(6-diethylaminoethoxy-2-naphthyl)-1-cyclohexanone (20 g., 0.06 mole) and ethyl chloroacetate (11.8 g., 0.096 mole) in dry benzene (200 ml.). After stirring for 17 hours at 25°, the reaction mixture is poured onto ice and extracted with ether. The ether extract is concentrated to yield 24.3 g. of crude product which is converted to its citric acid salt for purification. The pure citrate melts at 109–111°.

When any of the other cyclohexanones, cyclohexenones, cyclopentanones or cyclopentenones of U.S. Patent 3,139,430 are used as the starting material, the correspondingly substituted spiroglycidic ester is obtained.

EXAMPLE 8

3-(6-diethylaminoethoxy-2-naphthyl)-1-(2-hydroxyethyl)-1-cyclohexanol and its citrate salt A solution of ethyl 5-[6-(2-diethylaminoethoxy)-2-naphthyl]-1-oxaspiro-[2,5]-octane-2-carboxylate (4.2 g., 0.01 mole) in ether (50 ml.) is added dropwise to a stirred suspension of lithium aluminum hydride (1.8 g., 0.045 mole) in ether (200 ml). After refluxing for 4 hours the unreacted lithium aluminum hydride is decomposed with ethanol and water. The reaction mixture is filtered and the inorganic salts washed with ether. The filtrate is extracted with ether and the combined ethereal solutions are dried over sodium sulfate and concentrated to yield 3.25 g. of crude product. The product is converted to its citric acid salt which melts at 107–109° after recrystallization from isopropyl alcohol.

EXAMPLE 9

3-(6-diethylaminoethoxy-2-naphthyl)-1-(2-acetoxyethyl)-1-cyclohexyl acetate and its citrate salt A solution of 3-(6-diethylaminoethoxy-2-naphthyl)-1-(2-hydroxyethyl)-1-cyclohexanol (2 g.) in acetic anhydride (20 ml.) and pyridine (1 ml.) is heated to reflux over 1 hour and maintained at reflux for 15 minutes. The solution is cooled and the acetic anhydride decomposed with aqueous ammonia. The solution is made basic with aqueous sodium hydroxide and extracted with ether. The ether extract is dried over sodium sulfate and concentrated to yield 1.2 g. of product which may be converted to its citric acid salt melting at 112–114°.

When any of the other spiroglycidic esters of Example 7 are used in Examples 8 and 9, the corresponding acetoxyethylacetoxy compound is obtained.

EXAMPLE 10

Methyl 3-(6-diethylaminoethoxy-2-naphthyl)-1-acetoxycyclohexylketone and its citrate salt To a solution of 3-(6-diethylaminoethoxy-2-naphthyl)-1-ethynylcyclohexanol (3.6 g., 0.01 mole) in acetic acid (10 ml.) is added mercuric acetate (0.15 g.) and the mixture refluxed for 5 hours and then maintained at 70° for 17 hours. The mixture is made basic with aqueous sodium hydroxide and extracted with ether. The ether extract is dried over sodium sulfate and concentrated to yield 2 g. of product. The citric acid salt may be prepared and melts at 114.5–117.5.

When any of the other alkynylcyclohexanols prepared in Example 2 are used in the above procedure, the similarly substituted ketones are obtained.

EXAMPLE 11

3-(6-diethylaminoethoxy-2-naphthyl)-1-acetyl-1-cyclohexanol and its citrate salt A solution of 3-(6-diethylaminoethoxy-2-naphthyl)-1-ethynylcyclohexanol (3.6 g., 0.01 mole) in water (20 ml.) and sulfuric acid (1 g., 0.01 mole) is added to a mixture of water (20 ml.), mercuric oxide (0.24 g.) and sulfuric acid (0.5 ml.). After heating at 100° for 2 hours, the solution is made basic with aqueous sodium hydroxide and the product extracted with ether. The ether extract is dried over sodium sulfate and concentrated to yield 3 g. of product which may be converted to a citric acid salt, M.P. 115–122°.

When any of the other alkynyl cyclohexanols prepared in Example 2 is used in the above procedure, there is obtained the correspondingly substituted ketocyclohexanol.

EXAMPLE 12

3-(6-diethylaminoethoxy-2-naphthyl)-1-(1-hydroxyethyl)-1-cyclohexanol and its citrate salt A solution of 3-(6-diethylaminoethoxy-2-naphthyl)-1-acetyl-1-hydroxycyclohexane (3.8 g., 0.01 mole) in ether (60 ml.) is added dropwise to a suspension of lithium aluminum hydride (1.1 g., 0.03 mole) in ether (100 ml.). The mixture is refluxed for 3 hours. The unreacted lithium aluminum hydride is decomposed and the inorganic salts removed by filtration. The filtrate is concentrated to yield 3.2 g. of product. The compound may be converted to its citric acid salt which melts at 105–110°.

EXAMPLE 13

3-(6-diethylaminoethoxy-2-naphthyl)-1-methylene-cyclohexane and it citrate salt

A solution of 3-(6-diethylaminoethoxy-2-naphthyl) cyclohexanone (7.5 g., 0.23 mole) in ether (75 ml.) is added to triphenylphosphinemethylene (0.03 mole) in ether (100 ml.). The reaction mixture is stirred 48 hours at 25° and filtered. The filtrate is concentrated to an oil which is evaporatively distilled at 220° and 0.2 mm. to yield 3 g. of product. The compound may be converted to its citric acid salt which melts at 156.5–158°.

When any of the other cyclohexanones described in U.S. Patent 3,139,430 are used in the above procedure, the correspondingly substituted methylenyl compound is obtained.

EXAMPLE 14

3-(6-diethylaminoethoxy-2-naphthyl)-1-cyanomethylene-cyclohexane and its citrate salt A solution of 3-(6-diethylaminoethoxy-2-naphthyl) cyclohexanone (5.3 g., 0.02 mole) in ether (75 ml.) is added to triphenylphosphinecyanomethylene (0.03 mole) in ether (100 ml.). The reaction mixture is refluxed 65 hours and then filtered. The filtrate is extracted with dilute hydrochloric acid. The acid extract is made basic with dilute sodium hydroxide and extracted with ether. The ether solution is dried over sodium sulfate and concentrated to yield 2.1 g. of product. The compound may be converted to its citric acid salt which melts at 118–123°.

When any of the other cyclohexanones described in U.S. Patent 3,139,430 are used in the above procedure, the correspondingly substituted cyanomethylene compound is obtained.

What is claimed is:
1. A compound of the formula:

in which A is naphthalene or tetralin having the $R_1O$ and $R_2$ substituents in a 2,6 relationship to one another, $R_3$ is lower alkyl, $X_1$ is halogen, $m$ and $n$ are each whole numbers selected from 0, 1 and 2, $R_1$ is di(lower alkyl) amino lower alkyl or morpholino, and $R_2$ is a carbocyclic ring of the skeleton

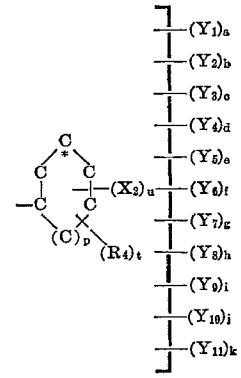

in which:
$p$ is a positive whole number selected from 0, 1 and 2;
$Y_1$ is hydroxyl;
$Y_2$ is lower alkanoyloxy;
$Y_3$ is lower alkynyl;
$Y_4$ is lower alkenyl;
$Y_5$ is perfluoroloweralkenyl;
$Y_6$ is hydroxyloweralkyl;
$Y_7$ is lower alkanoyloxy lower alkyl;
$Y_8$ is lower alkanoyl;
$Y_9$ is the structure

or the lower alkyl ester derivatives thereof;
$Y_{10}$ is methylenyl;
$Y_{11}$ is cyanomethylenyl;
said $Y_1$, $Y_2$, $Y_3$, $Y_4$, $Y_5$, $Y_6$, $Y_7$, $Y_8$, $Y_9$, $Y_{10}$ and $Y_{11}$ being bonded to the carbon marked with an asterisk;

$a$, $b$, $c$, $d$, $e$, $f$, $g$, $h$, $i$, $j$, and $k$ are each a whole number selected from 0 and 1, only one of said $a$ and $b$ being one at the same time, only one of said $c$, $d$, $e$, $f$, $g$ and $h$ being one at the same time, only one of said $i$, $j$ and $k$ being one at the same time, all of said $a$, $b$, $c$, $d$, $e$, $f$, $g$ and $h$ being zero when any of $i$, $j$ and $k$ is one, all of said $i$, $j$ and $k$ being zero when any of said $a$, $b$ and any of said $c$, $d$, $e$, $f$, $g$ and $h$ are one;

$R_4$ is lower alkyl;
$X_2$ is halogen;
$t$ and $u$ are each whole numbers selected from 0, 1 and 2; and wherein $R_2$ is either a saturated carbocyclic ring or an unsaturated carbocyclic ring containing from 1-3 double bonds one of which joins the carbon attached to the radical A with the carbon atom adjacent to the asterisk carbon;
and any valence bonds in said A and said $R_2$ radicals not satisfied by afore-defined structural characteristics are linked to hydrogen.

2. A compound according to claim 1 having the formula:

in which A is naphthalene or tetralin having the $R_1O$ and $R_2$ substituents in a 2,6 relationship to one another, $R_3$ is lower alkyl, $X_1$ is halogen, $m$ and $n$ are each whole numbers selected from 0, 1 and 2, $R_1$ is di(lower alkyl) amino lower alkyl and $R_2$ is a carbocyclic ring of the skeleton

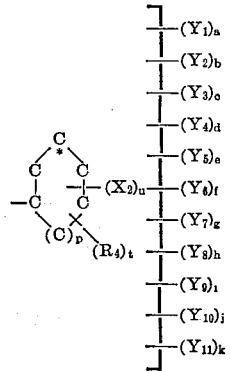

in which:
$p$ is a positive whole number selected from 0, 1 and 2;
$Y_1$ is hydroxyl;
$Y_2$ is lower alkanoyloxy;
$Y_3$ is lower alkynyl;
$Y_4$ is lower alkenyl;
$Y_5$ is perfluoroloweralkenyl;
$Y_6$ is hydroxyloweralkyl;
$Y_7$ is lower alkanoyloxy lower alkyl;
$Y_8$ is lower alkanoyl;
$Y_9$ is the structure CH—COOH or the lower alkyl ester derivative thereof;
$Y_{10}$ is methylenyl;
$Y_{11}$ is cyanomethylenyl;
said $Y_1$, $Y_2$, $Y_3$, $Y_4$, $Y_5$, $Y_6$, $Y_7$, $Y_8$, $Y_9$, $Y_{10}$ and $Y_{11}$ being bonded to the carbon marked with an asterisk;

$a$, $b$, $c$, $d$, $e$, $f$, $g$, $h$, $i$, $j$, and $k$ are each a whole number selected from 0 and 1, only one of said $a$ and $b$ being one at the same time, only one of said $c$, $d$, $e$, $f$, $g$ and $h$ being one at the same time, only one of said $i$, $j$ and $k$ being one at the same time, all of said $a$, $b$, $c$, $d$, $e$, $f$, $g$ and $h$ being zero when any of $i$, $j$ and $k$ is one, all of said $i$, $j$ and $k$ being zero when any of said $a$, $b$ and any of said $c$, $d$, $e$, $f$, $g$ and $h$ are one;

$R_4$ is lower alkyl;
$X_2$ is halogen;
$t$ and $u$ are each whole numbers selected from 0, 1 and 2; and wherein $R_2$ is either a saturated carbocyclic ring or an unsaturated carbocyclic ring containing from 1-3 double bonds one of which joins the carbon attached to the radical A with the carbon atom adjacent to the asterisk carbon;
and any valence bonds in said A and said $R_2$ radicals not satisfied by afore-defined structural characteristics are linked to hydrogen.

3. A compound according to claim 2 having the formula:

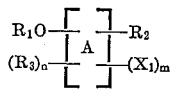

in which A is naphthalene or tetralin having the $R_1O$ and $R_2$ substituents in a 2,6 relationship to one another, $R_3$ is lower alkyl, $X_1$ is halogen, $m$ and $n$ are each whole numbers selected from 0, 1 and 2, $R_1$ is di(lower alkyl) amino lower alkyl and $R_2$ is selected from the group consisting of

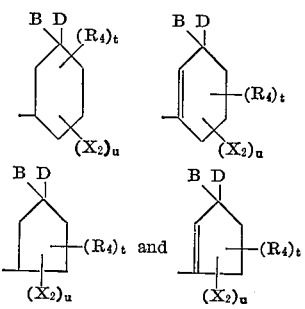

in which
B is selected from the group consisting of hydroxyl, lower alkanoyloxy and together with D, methylene and cyanomethylene;
D is selected from the group consisting of lower alkynyl, lower alkenyl, perfluoroloweralkenyl, hydroxyloweralkyl, loweralkanoyloxyloweralkyl and together with B, methylene and cyanomethylene;
$R_4$ is lower alkyl;
$X_2$ is halogen;
$t$ and $u$ are whole numbers from 0 to 2, inclusive; and any valence bonds not satisfied by the above definitions are linked to hydrogen.

4. A compound according to claim 2 having the formula:

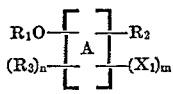

in which A is naphthalene or tetralin having the $R_1O$ and $R_2$ substituents in a 2,6 relationship to one another, $R_3$ is lower alkyl, $X_1$ is halogen, $m$ and $n$ are each whole numbers selected from 0, 1 and 2, $R_1$ is di(lower alkyl) amino lower alkyl and $R_2$ is a radical of the formula:

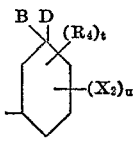

in which

B is selected from the group consisting of hydroxyl, lower alkanoyloxy and together with D, methylene and cyanomethylene;
D is selected from the group consisting of lower alkynyl, lower alkenyl, perfluoroloweralkenyl, hydroxyloweralkyl, loweralkanoyloxyloweralkyl and together with B, methylene and cyanomethylene;
$R_4$ is lower alkyl;
$X_2$ is halogen;
$t$ and $u$ are each whole numbers selected from 0, 1 and 2;
and any valence bonds in said A rings not satisfied by the above-defined structural characteristics are linked to hydrogen.

5. A compound according to claim 2 having the formula:

in which A is naphthalene or tetralin having the $R_1O$ and $R_2$ substituents in a 2,6 relationship to one another, $R_3$ is lower alkyl, $X_1$ is halogen, $m$ and $n$ are each whole numbers selected from 0, 1 and 2, $R_1$ is di(lower alkyl) amino lower alkyl and $R_2$ is a radical of the formula:

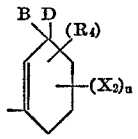

in which

B is selected from the group consisting of hydroxyl, lower alkanoyloxy and together with D, methylene and cyanomethylene;
D is selected from the group consisting of lower alkynyl, lower alkenyl, perfluoroloweralkenyl, hydroxyloweralkyl, loweralkanoyloxyloweralkyl and together with B, methylene and cyanomethylene;
$R_4$ is lower alkyl;
$X_2$ is halogen;
$t$ and $u$ are each whole numbers selected from 0, 1 and 2;
and any valence bonds in said A rings not satisfied by the above-defined structural characteristics are linked to hydrogen.

6. A compound according to claim 2 having the formula:

in which A is naphthalene or tetralin having the $R_1O$ and $R_2$ substituents in a 2,6-relationship to one another, $R_3$ is lower alkyl, $X_1$ is halogen, $m$ and $n$ are each whole numbers selected from 0, 1 and 2, $R_1$ is di(lower alkyl) amino lower alkyl and $R_2$ is a radical of the formula:

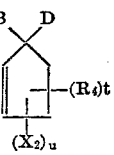

in which

B is selected from the group consisting of hydroxyl, lower alkanoyloxy and together with D, methylene and cyanomethylene;
D is selected from the group consisting of lower alkynyl, lower alkenyl, perfluoroloweralkenyl, hydroxyloweralkyl, loweralkanoyloxyloweralkyl and together with B, methylene and cyanomethylene;
$R_4$ is lower alkyl;
$X_2$ is halogen;
$t$ and $u$ are each whole numbers selected from 0, 1 and 2;
and any valence bands in said A rings not satisfied by the above-defined structural characteristics are linked to hydrogen.

7. A compound according to claim 2 having the formula:

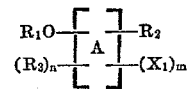

in which A is naphthalene or tetralin having the $R_1O$ and $R_2$ substituents in a 2,6 relationship to one another, $R_3$ is lower alkyl, $X_1$ is halogen, $m$ and $n$ are each whole numbers selected from 0, 1 and 2, $R_1$ is di(lower alkyl) amino lower alkyl and $R_2$ is a radical of the formula:

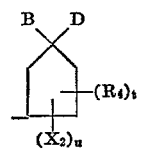

in which

B is selected from the group consisting of hydroxyl, lower alkanoyloxy and together with D, methylene and cyanomethylene;
D is selected from the group consisting of lower alkynyl, lower alkenyl, perfluoroloweralkenyl, hydroxyloweralkyl, loweralkanoyloxyloweralkyl and together with B, methylene and cyanomethylene;
$R_4$ is lower alkyl;
$X_2$ is halogen;
$t$ and $u$ are each whole numbers selected from 0, 1 and 2;
and any valence bands in said A rings not satisfied by the above-defined structural characteristics are linked to hydrogen.

8. A compound according to claim 5 having the formula:

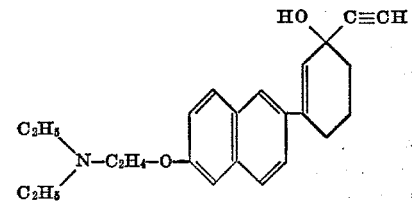

9. A compound according to claim 6 having the formula:

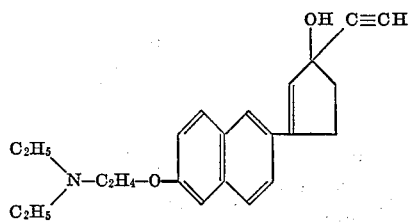

10. A compound according to claim 4 having the formula:

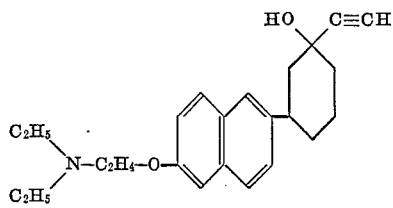

or its hydrochloride salt.

11. A compound according to claim 5 having the formula:

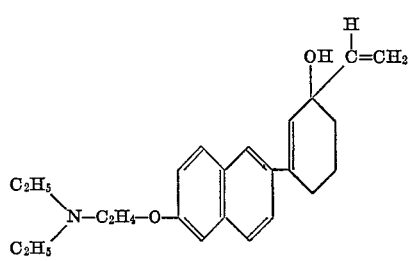

12. A compound according to claim 4 having the formula:

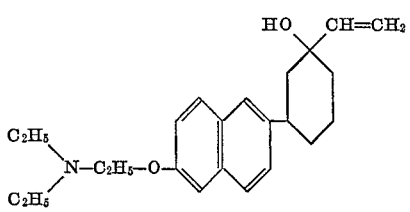

or its citrate salt.

13. A compound according to claim 4 having the formula:

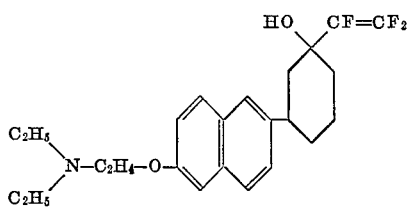

or its citrate salt.

14. A compound according to claim 2 having the formula:

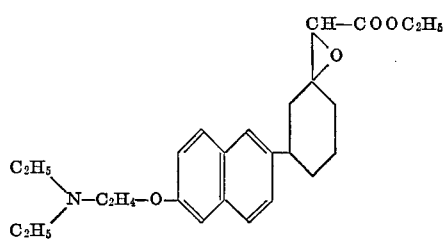

or its citrate salt.

15. A compound according to claim 4 having the formula:

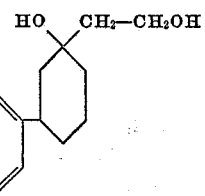

or its citrate salt.

16. A compound according to claim 4 having the formula:

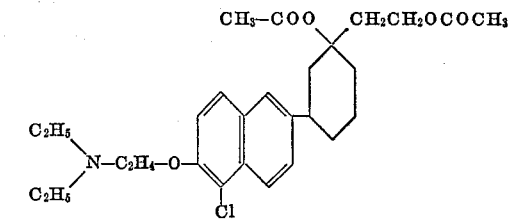

or its citrate salt.

17. A compound according to claim 2 having the formula:

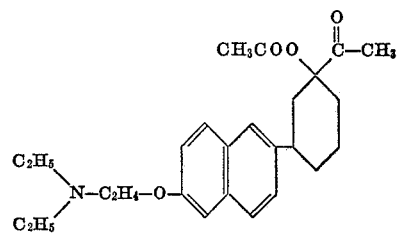

or its citrate salt.

18. A compound according to claim 2 having the formula:

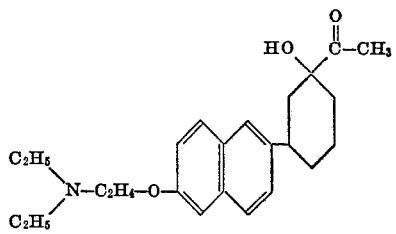

or its citrate salt.

19. A compound according to claim 4 having the formula:

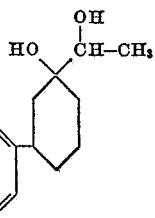

or its citrate salt.

20. A compound according to claim 4 having the formula:

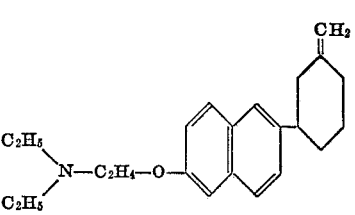

or its citrate salt.

21. A compound according to claim 4 having the formula:
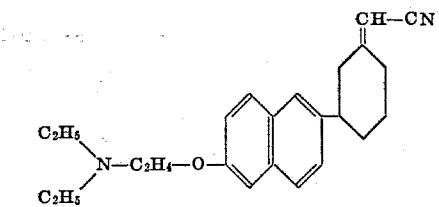
or its citrate salt.
22. A compound according to claim 1 having the formula:
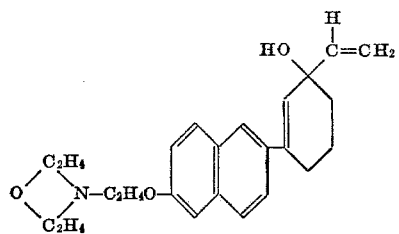
No references cited.
ALEX MAZEL, Primary Examiner
J. TOVAR, Assistant Examiner
U.S. Cl. X.R.
260—348, 570.7, 247.2, 465, 490; 424—248, 311, 304, 330